(12) United States Patent
Bruhn

(10) Patent No.: US 9,025,504 B2
(45) Date of Patent: May 5, 2015

(54) BANDWIDTH EFFICIENCY IN A WIRELESS COMMUNICATIONS NETWORK

(75) Inventor: Stefan Bruhn, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 420 days.

(21) Appl. No.: 13/176,142

(22) Filed: Jul. 5, 2011

(65) Prior Publication Data

US 2012/0140650 A1 Jun. 7, 2012

Related U.S. Application Data

(60) Provisional application No. 61/419,337, filed on Dec. 3, 2010.

(51) Int. Cl.
| | | |
|---|---|---|
| H04B 7/00 | (2006.01) | |
| H04W 28/06 | (2009.01) | |
| H04L 1/00 | (2006.01) | |
| G10L 19/005 | (2013.01) | |
| G10L 19/16 | (2013.01) | |

(52) U.S. Cl.
CPC ........... *H04W 28/065* (2013.01); *G10L 19/005* (2013.01); *G10L 19/167* (2013.01); *H04L 1/0007* (2013.01); *H04L 1/0014* (2013.01); *H04L 1/0015* (2013.01)

(58) Field of Classification Search
USPC .......................... 370/229–235, 329, 545–546
See application file for complete search history.

(56) References Cited

U.S. PATENT DOCUMENTS

| | | | | |
|---|---|---|---|---|
| 4,852,179 A | * | 7/1989 | Fette | 704/230 |
| 5,410,632 A | * | 4/1995 | Hong et al. | 704/233 |
| 5,689,615 A | * | 11/1997 | Benyassine et al. | 704/219 |
| 6,889,187 B2 | * | 5/2005 | Zhang | 704/253 |
| 7,145,884 B2 | * | 12/2006 | Li | 370/263 |
| 2007/0147285 A1 | * | 6/2007 | Jin et al. | 370/329 |
| 2007/0147314 A1 | | 6/2007 | Taleb et al. | |
| 2007/0263672 A1 | * | 11/2007 | Ojala et al. | 370/516 |
| 2010/0145688 A1 | * | 6/2010 | Sung et al. | 704/208 |

FOREIGN PATENT DOCUMENTS

| | | |
|---|---|---|
| EP | 1 538 806 A2 | 6/2005 |
| WO | WO 2008/024056 | 2/2008 |

OTHER PUBLICATIONS

International Search Report mailed Sep. 15, 2011 in corresponding Application No. PCT/EP2011/060592.

Kim et al., "Boosting VOIP Capacity of Wireless Mesh Networks Through Lazy Frame Aggregation", IEICE Transactions on Communications, Communications Society, Tokyo, JP, vol., E908, No. 5, May 1, 2007, pp. 1283-1285, XP001541936.

Antti Vähätalo et al., "Voice Activity Detection for GSM Adaptive Multi-Rate Codec", Speech Coding Proceedings, 1999 IEEE Workshop, Jun. 20-23, 1999, pp. 55-57.

E. Ekudden et al., "The Adaptive Multi-Rate Speech Coder", Speech Coding Proceedings, 1999 IEEE Workshop, Jun. 20-23, 1999, pp. 117-119.

* cited by examiner

*Primary Examiner* — Kwang B Yao
*Assistant Examiner* — Juvena Loo
(74) *Attorney, Agent, or Firm* — Nixon & Vanderhye, P.C.

(57) ABSTRACT

A method of processing a signal for transmission, the method comprising: determining a quality of a first portion of the signal; and if the quality satisfies a threshold criterion then aggregating a representation of the first portion of the signal with a representation of a subsequent portion of the signal.

28 Claims, 6 Drawing Sheets

BANDWIDTH EFFICIENCY IN A WIRELESS COMMUNICATIONS NETWORK

CROSS-REFERENCE

This application claims the benefit of Provisional Application No. 61/419,337, filed Dec. 3, 2010, the entire content of which is hereby incorporated by reference in this application.

TECHNICAL FIELD

The present application relates to a method of processing a signal for transmission; an apparatus for processing a signal for transmission; and a computer-readable medium.

BACKGROUND

The Adaptive Multi-Rate (AMR) codec family is used as the mandatory codec in both GSM and WCDMA systems. AMR is available as both narrowband (AMR-NB) and wideband (AMR-WB) forms. The standards comprise a number of technical specifications of multiple components and functions, e.g. Speech codec (AMR-NB, AMR-WB), Voice Activity Detector (VAD), Discontinuous transmission system (DTX), Comfort Noise (CN), Link Adaptation (LA) etc. All these functions are defined and described in the 3GPP TS 26-series specifications. Further, a description of the AMR-NB codec is given in "The Adaptive Multi-Rate Speech Coder", IEEE Speech Coding Workshop, Porvoo, Finland, p. 117-119, 1999, authored by Ekudden, E., Hagen, R., Johansson, I., Svedberg, J. Further still, descriptions of the VAD are given in "Voice activity detection for the GSM Adaptive Multi-Rate Codec", IEEE Speech Coding Workshop, Porvoo, Finland, p. 55-57, 1999, authored by Vähätalo, A. and Johansson, I.

The AMR-NB and AMR-WB speech codecs have a number of operating modes which make it possible to run the codec at different bit rates, e.g. corresponding to different subjective speech quality performance. The AMR-NB codec can operate at 8 different bit rates ranging from 4.75 kbps up to 12.2 kbps as described in Table 1 below. Throughout this document "bps" stands for bits per second. During speech silence periods, as detected by the VAD, the system generates spectrally shaped Comfort Noise (CN). The CN is described with 35 bits and given continuous transmission of these parameters once per frame, the bitrate for the CN would be 1.75 kbps. In practice, the actual updating in the system is normally only once every 8th frame, so the bitrate for CN is one eighth of that value, so in fact 218.75 bps.

TABLE 1

Source codec bit-rates for the AMR-NB codec

| Codec mode | Source codec bit-rate |
| --- | --- |
| AMR_12.20 | 12,20 kbps |
| AMR_10.20 | 10,20 kbps |
| AMR_7.95 | 7,95 kbps |
| AMR_7.40 | 7,40 kbps |
| AMR_6.70 | 6,70 kbps |
| AMR_5.90 | 5,90 kbps |
| AMR_5.15 | 5,15 kbps |
| AMR_4.75 | 4,75 kbps |
| AMR_SID | 1,75 kbps (218.75 bps) |

Normally the system is also configured using a discontinuous transmission system (DTX) including a Voice Activity Detector (VAD) and a Comfort Noise generator (CN). These operate to detect active speech and transmit the speech signal during voice activity and also to detect speech inactivity in order to inhibit the speech signal transmission and instead to activate comfort noise generation. The proportion of voice activity is called Voice Activity Factor (VAF). The combination of the DTX, VAD and CN functions is referred to as a "DTX/VAD/CN system" from here on.

The total system capacity of a cellular communication system using a standard such as GSM and WCDMA is related to the voice activity factor (VAF). A cellular communication system generally has two transmission links, uplink (UL) and downlink (DL), from and respectively to the mobile terminal. The currently employed AMR system uses the same "DTX/VAD/CN system" in both UL and DL.

Speech transmission with DTX operation can be regarded as a simple source-controlled variable bit rate encoding method where the rate can be varied between two levels, one for active speech and the other for inactivity (and comfort noise transmission). However, the term source controlled rate variable bit rate operation (SCR VBR) typically refers to a method where the bit rate during active speech can be varied according to the needs of the source signal, e.g. in order to maintain a constant quality level. SCR VBR coding hence pursues a similar objective as speech transmission with DTX but can additionally vary the bit rate even during active speech. Examples of speech and audio codecs with SCR VBR are the 3GPP2 VMR-WB codec, 3GPP2 Enhanced Variable Rate Codec (EVRC) and MPEG Advanced Audio Codec (AAC).

Variable frame offset (VFO) coding is described in US20070147314A1. This is a method that suspends the transmission of those speech segments that the speech decoder can properly extrapolate from the received speech. The basic idea is to operate a fixed-frame length codec in such a way that a coding frame is no longer restricted to start immediately after the end of the previous coding frame. The gain provided by this method is that the effective frame rate of the codec is reduced despite the codec frame length remaining constant. Since the coding bit rate is associated with each transmitted codec frame, the average bit rate is reduced. The system thus operates as a variable rate codec, even when a constant coding bit rate is used.

Real-time packet switched transmission of speech and audio data for Voice over Internet Protocol (VoIP) applications generally makes use of the IETF Real-time Transmission Protocol (RTP) (as described in RFC 3650). This protocol provides a time-stamp field indicating the sampling instant of the first sample instant of the first sample encoded for the first frame-block in the packet. With VoIP services over wireless it remains important to reduce the bitrate over the wireless links as in circuit switched transmissions. The bit rate can be reduced by using speech transmission with DTX, another SCR VBR operation, or VFO coding as described above. A further bit rate reduction method is to reduce the overhead of the transmitted packets. One such method is header compression such as Robust Header Compression (ROHC). ROHC is described in more detail in IETF RFC3095, RFC3843, and RFC4019.

The general objective of the above described technologies is to temporally reduce the used transmission resource while maintaining the quality. The following paragraphs discuss some problems related to these techniques.

While SCR VBR coding is able to reduce the average source coding bit rate, it is not always desirable to use this feature in every communication system. In the LTE system for instance, a change of source coding bit rate involves extra signaling which in turn may cost additional transmission resources or transmission delay. See 3GPP tdoc S4-100438: On the suitability of a variable-rate coding for VoIP over LTE for more information. A further problem of SCR VBR coding is that it only reduces the net bit rate of the codec. Overhead related to packet switched transmissions like packet headers would remain unchanged and hence the relative bandwidth reduction using SCR VBR coding may be small and not worth the costs and complications associated with it, especially considering the described possible transmission system related drawbacks.

VFO coding is a solution addressing the problem of SRC VBR coding where the packet overhead does not scale with the adaptively selected bit rate. However, VFO coding suffers from other problems. For example, where the segment boundaries do not match the speech codec frame boundaries, efficiency losses may occur when VFO is used with robust header compression schemes like ROHC. These efficiency losses happen because the header compression algorithm may lose the ability to efficiently predict parts of the IP packet headers. In addition, the gain of VFO coding may be limited in cases where minor or no quality sacrifice is required. This reduces the likelihood of finding speech segments that can be properly extrapolated by the decoder from the earlier received speech, and thus reduces the likelihood of savings.

DTX is a very effective rate reduction method for periods of speech inactivity since it suspends transmission during such periods. Ideally, a DTX system would only transmit active speech while the inactive signal (background noise) that is irrelevant for the receiving end would not be transmitted at all. In practice, there is no ideal VAD algorithm that is able to distinguish the active speech parts from the inactive parts in an input speech signal with total reliability. Hence, it is an important aim to design a DTX system such that as much transmission resource as possible is saved, while still avoiding possible coding artifacts such as clipping of active speech parts, which may seriously affect the speech quality. Clipping often occurs for trailing parts of the speech (back-end clipping) or also in unvoiced parts of the speech with low-energy. One solution to the back-end clipping problem is to add a so-called hangover period for the transition period between active speech and inactivity. The hangover period is always coded as active speech, irrespective of the active speech/inactivity indication or a quality indication by the VAD. While adding a hangover period is a safe approach for the avoidance of back-end clipping it reduces the bandwidth efficiency gain that DTX can provide since, by design, a large portion of the hangover period is likely to be inactivity that does not require active speech coding to maintain signal quality.

The above described technologies and techniques, provide some scope for optimizing the use of bandwidth in a communication system. However, as evident from the above explanation, these techniques are disadvantageous or at least suboptimal in some way and there remains a need for further techniques to improve the bandwidth efficiency of a wireless communication system. Further, any improvement must be realized while maintaining an appropriate level of quality of service.

SUMMARY

Frame aggregation allows reduction of at least the relative overhead in relation to the transmitted speech payload. This means that not only one coded speech frame is transmitted per packet but that a plurality of coded speech frames are transmitted in a packet. Typically, the packetization overhead does not significantly increase with the size of the packet and hence the relative overhead is reduced if more frames are aggregated. The drawback of frame aggregation is that it causes extra delay corresponding to the number and the lengths of the aggregated frames. This is because the packet cannot be transmitted until all the frames in it are collected. Frame aggregation may also increase the subjective impact of packet losses since the loss of an aggregated packet affects all the frames that are aggregated in the packet.

The methods and apparatus disclosed herein aim to increase transmission efficiency by employing frame aggregation, but in an adaptive fashion controlled by the source signal. In cases where the speech signal is fairly stationary and where a frame can be extrapolated with good fidelity from previously received speech information without significantly degrading the speech quality, this frame is delayed and aggregated with the subsequent frame or frames. Otherwise, the frame is not delayed and aggregated with subsequent frames and instead is sent directly.

Accordingly, there is provided a method of processing a signal for transmission. The method comprises determining a quality of a first portion of the signal. The method further comprises, if the quality satisfies a threshold criterion, then aggregating a representation of the first portion of the signal with a representation of a subsequent portion of the signal.

The quality associated with portions of the signal may be defined in various ways. E.g. it could be related to the subjective importance of the portions of the input signal that are to be transmitted. A portion of the input signal that is noisy or has a low level can be regarded subjectively less important and has a lower associated quality. The quality could also be related to the reconstruction of the input signal portion after coding and/or potential frame loss. If the reconstructed signal resembles the input signal with high fidelity it has a high quality, otherwise the quality will be low. The quality may also be associated with the stationarity of the signal, where high stationarity will allow extrapolations of the signal with high quality.

The quality threshold criterion may be that the quality of the first portion of the signal is either less than a threshold quality value or above a threshold quality value, depending on the definition of the quality term. The quality threshold criterion may for example also be that the stationarity of the first portion of the signal is greater than a threshold stationarity value.

The aggregation of representations of portions of a signal reduces the packetization overhead in the data to be transmitted. However, aggregation can increase the likelihood that a portion of a signal is not received by the time it is needed. Accordingly, only representations of portions of a signal that cause relatively small quality impact if not received (or received too late), or which are relatively unimportant for the perceived quality are selected for aggregation by comparing a quality of that portion with a threshold quality value.

The determining of a quality of a first portion of the signal may comprise making a comparison between a first portion of the signal and an estimation of a first portion of the signal. The estimation of a first portion of the signal may be an estimation based upon at least one previous portion of the signal. The estimation of a first portion of the signal may be determined using local synthesis based upon at least one previous portion of the signal.

A representation of a particular portion of the signal may comprise the encode parameters of the particular portion of the signal. The method may further comprise: encoding the first portion of the signal; and encoding the subsequent portion of the signal. The encoding rate or rates of the portions of the signal in an aggregated packet may be reduced as compared to a non-aggregated packet such that an aggregated packet is no larger than a non-aggregated packet.

The encoding rate of a portion of the signal may be determined according to at least one of: the determined quality; the number of representations of portions of the signal that are aggregated together; and the encoding rate of another portion of the signal.

A plurality of representations of portions of the signal may be aggregated, and the aggregation may stop when the most recently aggregated representation of a portion of the signal either: satisfies a threshold maximum number of portions of the signal which may be aggregated and packetized into a single aggregated packet; or has a quality that does not satisfy the threshold criteria. When the aggregation stops, the aggregation for the currently aggregated representations stops. When the aggregation stops no further representations of portions of the signal are aggregated with the currently aggregated representations. Further aggregation of subsequent representations of signal portions is still possible.

The method may further comprise packetizing the aggregated representations of portions of the signal in an aggregated packet. The method may further comprise transmitting the aggregated representations of portions of the signal in an aggregated packet. A representation of the first portion of the signal may be aggregated with a representation of a subsequent portion of the signal if the first portion is determined to be within a hangover period.

There is further provided an apparatus for processing a signal for transmission. The apparatus comprises a signal analyzer arranged to determine a quality of a first portion of the signal. The apparatus further comprises an aggregator arranged to aggregate a representation of the first portion of the signal with a representation of a subsequent portion of the signal if the quality satisfies a threshold criterion.

The apparatus may further comprise an encoder arranged to encode portions of the signal to generate respective representations of the portions of the signal. The apparatus may further comprise a packetizer arranged to packetize the aggregated representations of portions of the signal in an aggregated packet.

The aggregator may be arranged to aggregate a plurality of representations of portions of the signal, and the aggregated representations of portions may be packetized by a packetizer when the most recent portion of the signal either: satisfies a threshold maximum number of portions of the signal which may be aggregated into a single aggregated packet; or has a quality that does not satisfy the threshold criterion. The apparatus may further comprise a transmitter arranged to transmit the aggregated packet.

The first portion of the signal may be aggregated with a subsequent portion of the signal if the first portion is determined to be within a hangover period. The signal quality may be determined using local synthesis based upon at least one preceding frame.

The encoding rate of the first portion of the signal may be determined according to the determined quality. The encoding rate or rates of the portions of the signal in an aggregated packet may be reduced as compared to a non-aggregated packet such that an aggregated packet is no larger than a non-aggregated packet.

There is further provided a computer-readable medium, carrying instructions, which, when executed by computer logic, causes said computer logic to carry out any of the methods defined herein.

BRIEF DESCRIPTION OF THE DRAWINGS

A method and apparatus for improved bandwidth efficiency in a wireless communications network will now be described, by way of example only, with reference to the accompanying drawings, in which.

It should be noted that the arrangement of bits within a packet in FIGS. 2, 3, 4 and 5 is purely figurative and is not meant to illustrate the order in which particular bits or packet sections are transmitted. Further, the size of the bit areas identified are not to scale.

DETAILED DESCRIPTION

A first embodiment of the method disclosed herein is applied in a system which uses discontinuous transmission (DTX). A Voice Activity Detector (VAD) determines whether active speech is present which needs transmission. In order to avoid clipping (as described above) a hangover period is applied between each active speech period and each inactive speech period. The hangover period comprises a plurality of frames which are inactive according to the VAD but where the VAD decision may still be unreliable or unstable.

Figure 1:
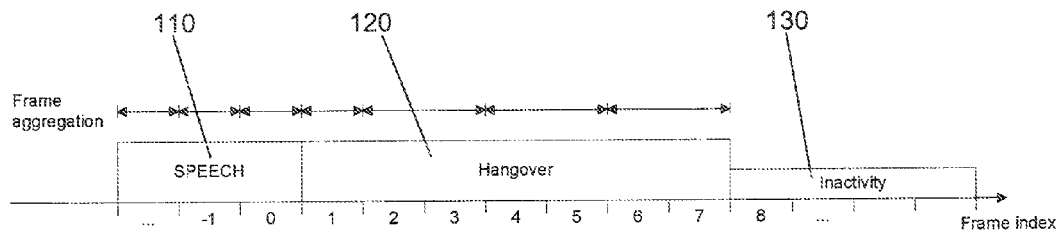
FIG. 1 illustrates a hangover period.

A hangover period is illustrated in FIG. 1. A period of active speech 110 is determined to end at the end of frame 0. There then follows a hangover period 120 comprising 7 frames. An inactivity period 130 starts at the beginning of frame 8. The bitrate required for transmission of the signal is shown on the vertical axis of FIG. 1. Both the period of active speech 110 and the hangover period 120 have the same bitrate. The inactivity period 130 has a lower bitrate than both the period of active speech 110 and the hangover period 120.

Typically, during the hangover period 120 even if the VAD decision is wrong and the signal is actually speech, the speech signal is likely of low energy and unvoiced. It has been recognized that such sounds can usually be extrapolated from earlier received speech without significant perceptual impact.

According to a first embodiment of the method disclosed herein, not all frames are packetized and transmitted immediately. Instead, a plurality of frames having a particular quality, such as being within a hangover period, are aggregated into one packet prior to transmission. The number of aggregated frames per packet may be a design parameter or implementation detail. In this example 2 frames are aggregated into a single packet.

By way of example, the application of this method to the hangover period illustrated in FIG. 1 will now be described. This hangover period has a duration of n=7 frames, and the frames within this period are indexed from k=1 to k=7. The first frame with index k=1 is not aggregated with any subsequent frame and is transmitted directly. Frames k=2, k=4 and k=6 however are delayed and aggregated with the respective subsequent frames k=3, k=5 and k=7. These are then packetized and transmitted. This aggregation is illustrated in FIG. 1 by the double ended arrows.

The method according to this first embodiment provides a reduction of the packetization overhead during the hangover period. This can be done without significant impact on the communication quality because if a frame of the hangover period is not received in time to recreate the signal for playback when it is needed, then the signal portion contained in that frame may be reliably extrapolated from the preceding signal.

Figure 2A:
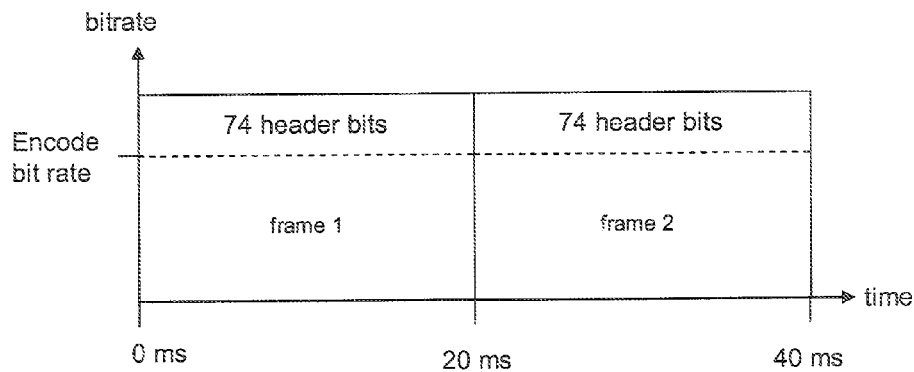
FIGS. 2a and 2b illustrate aggregation of two frames.

A specific example will now be described with reference to FIGS. 2a and 2b, to demonstrate the bandwidth saving from this method. A typical overhead occurring in mobile communication networks over an air-interface like LTE and using AMR or AMR-WB speech codecs with an RTP payload format like IETF RFC 4867, would comprise 64 bits per packet for the RLP overhead and 10 bits per single frame packet for the RTP payload header, giving a total of 74 bits. FIG. 2a shows two consecutive packets each containing a frame, frames 1 and 2 respectively, each encoded at an encode bitrate and each having a header of 74 bits.

In the case that two frames are aggregated the RLP overhead per packet remains the same and the RTP overhead becomes 16 bits, giving a total header size of 80 bits. Hence, aggregation of the two frames reduces the total overhead from 74 bits per frame to 40 bits per frame. This is illustrated in FIG. 2b where a single packet is shown containing both frame 1 and frame 2 both frames encoded to have the same total number of bits as in FIG. 2a, with the 80 bit header illustrated spanning both frames.

Figure 2B:
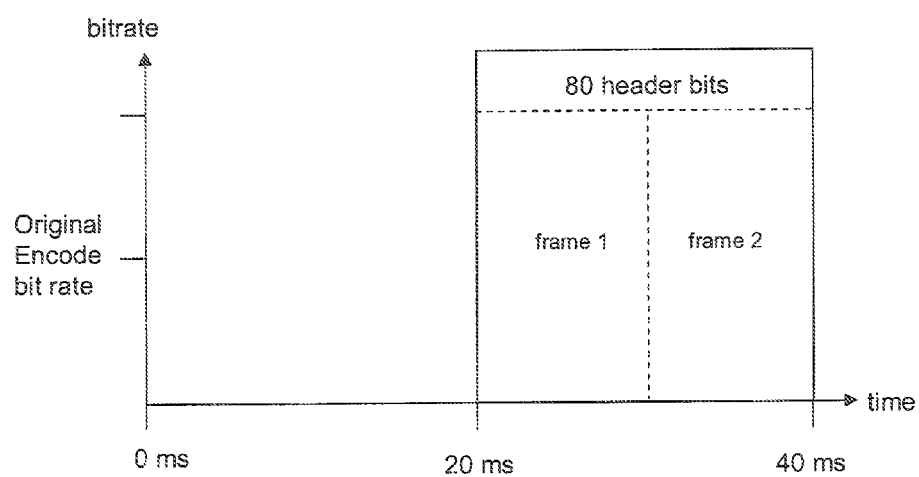

The frame aggregation in FIG. 2b thus provides a bit rate reduction of 34 bits per frame as compared to the non-aggregated arrangement of FIG. 2a. There are fifty 20 millisecond frames per second, so a 34 bit saving per frame equates to a saving of 1700 bits per second. The bit rate reduction with this embodiment may be small but it is significant. In particular, in cases with speech amongst background noise, the VAD decision is likely to frequently toggle between active speech and inactivity, and here the gain may be very worthwhile.

In a second embodiment, the above described method is extended to increase the bandwidth efficiency. This embodiment is based upon the observation that the frames during the hangover period (regardless of whether they relate to speech or not) typically do not require the full bit rate to be transmitted at an acceptable quality, unlike frames during an active speech period. According to this embodiment, a source coding bit rate reduction for the signal during the hangover period is applied which does not significantly affect the received signal quality. This is achieved by using an SCR VBR codec to transmit the frames occurring during the hangover period at a reduced bit rate. However, in order to overcome the above identified problems associated with SCR VBR schemes, this embodiment uses such a technique in conjunction with adaptive frame aggregation. The application of the adaptive frame aggregation to SCR VBR coding makes it possible to maintain a constant packet size for transmission, by reducing the number of packets that are transmitted when lower bitrates are used for encoding.

Figure 3:
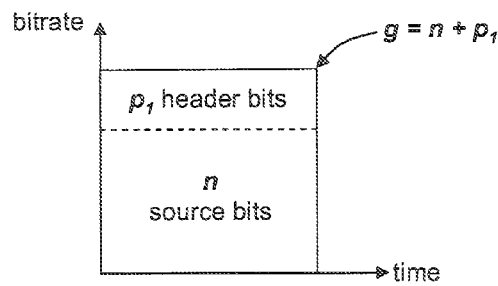
FIG. 3 illustrates a generalized packet.

FIG. 3 illustrates a generalized packet. The number of bits per frame used for transmission of signal (e.g. active speech) is n, and these are referred to as source bits. The packetization overhead comprises $p_1$ bits. Accordingly, the number of bits per packet with one frame per packet will be $g=n+p_1$.

Figure 4A:
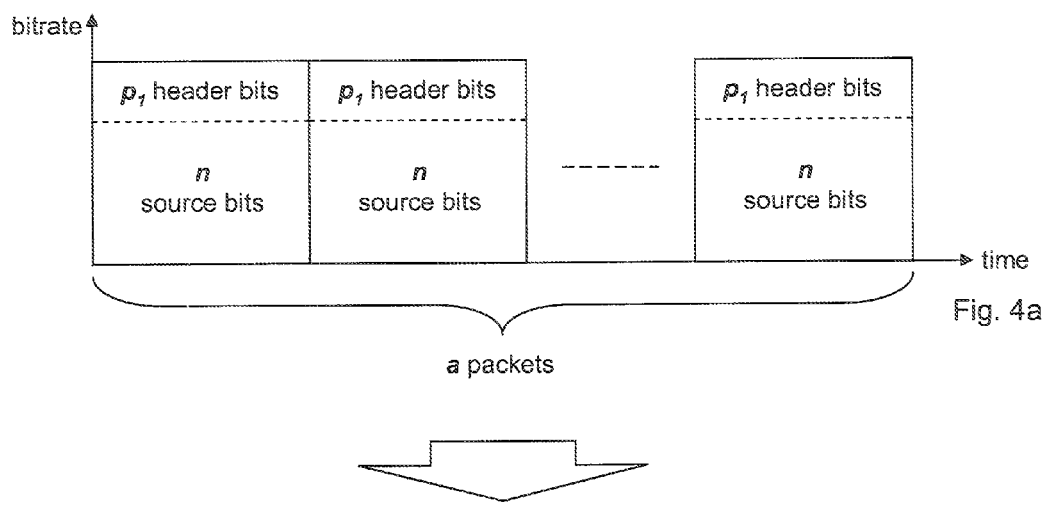
FIGS. 4a and 4b illustrate the aggregation of a plurality of frames.
Figure 4B:
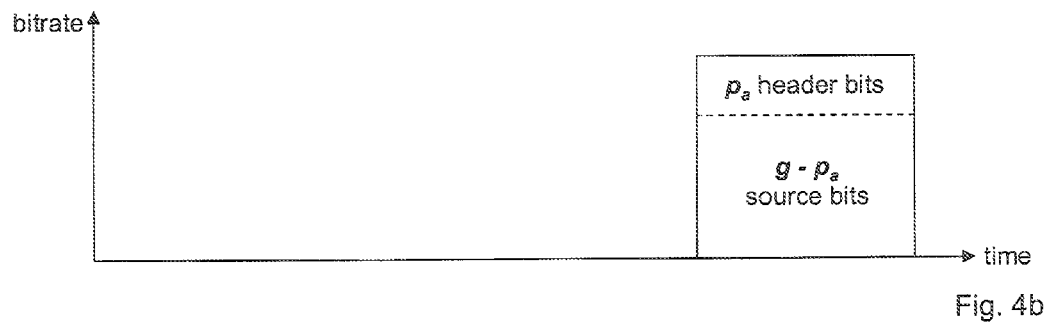

FIG. 4 illustrates the aggregation of a packets (FIG. 4a) into a single packet (FIG. 4b). FIG. 4a shows a packets each corresponding to a frame and each comprising n source bits and $p_1$ header bits. FIG. 4b shows the a frames from FIG. 4a aggregated into a single packet which still has a total size of g bits. The packet overhead for the aggregated packets is $p_a$ bits, and therefore the available source bits in the aggregated packet are $g-p_a$ bits. It follows that, if evenly distributed, the available source coding rate per frame within the aggregated packet will be $n_a=(g-p_a)/a$. This will reduce the gross bit rate needed for transmission by as much as a factor of 1/a.

Therefore, according to the second embodiment, the source adaptive frame aggregation as exemplified in the above described first embodiment is performed, but in addition to that, the source coding bit rate for each frame is reduced such that packets containing aggregated frames are the same size as the packets containing non-aggregated frames. This constant packet size overcomes the signaling problems encountered with using an SCR VBR codec over certain communications networks, such as, for example an LTE network.

This second embodiment may be further extended to use adaptive frame aggregation during the hangover period so as to adapt the number of aggregated frames. The adaptation can be made depending on the expected capability of the decoder to extrapolate the aggregated frames to compensate for the increased likelihood of the frame being received too late. The adaptation in turn may be based on the properties of the input signal, such as e.g. energy, spectrum, voicing, stationarity, etc, or dependent on the reliability of the VAD decision (that is, based on parameters calculated in the VAD algorithm).

The second embodiment not only reduces the packetization overhead during a hangover period, but also overcomes the above described drawbacks with SCR VBR coding that result from the transmission of packets with varying size in certain transmission networks such as LTE. As disclosed herein, the speech codec is operated with source controlled rate (SCR) operation. The encoding rate is selected dependent on the properties of the input speech signal, but with a rate and aggregation constraint. The constraint is such that for a group of a consecutive frames the bit rate per frame may be changed from some regular rate of n bits per frame to some other rate per frame under the proviso that these frames are aggregated to a packet size of g bits. This packet size of g bits is the total size of the packet including packetization overhead and is identical to the packet size used for frames that are transmitted without aggregation as single-frame packets. If the number of aggregated frames is a and the overhead for the aggregated frame packet $p_a$, then (as above) the maximum available source coding rate per frame will be $n_a=(g-p_a)/a$. Although, it is even possible that the rate of the aggregated frames may vary within the aggregated packet, provided that the constraint is met that the number of bits of the aggregated frames $(n_1, n_2, \ldots, n_a)$ sums up to a total having a maximum value of $g-p_a$ bits. This modification can be particularly useful if the SCR decision logic assigns different target bit rates for the frames within an aggregation block, for instance in order to maintain a certain target coding quality.

Figure 5A:
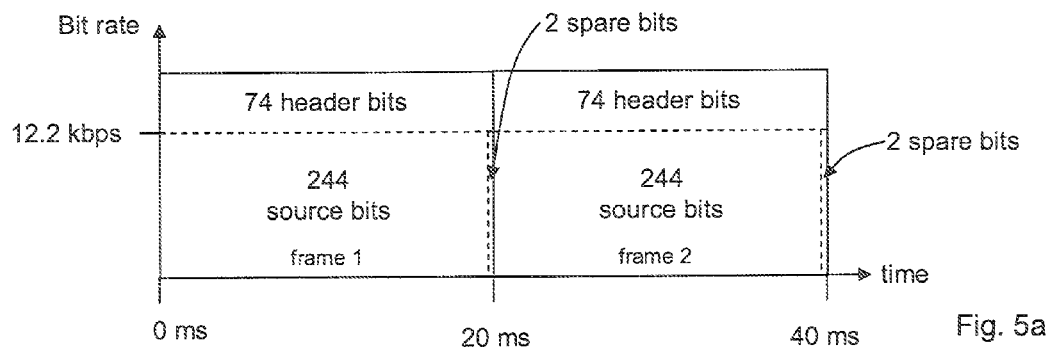
FIGS. 5a, 5b and 5c illustrate two specific examples of frame aggregation.
Figure 5B:
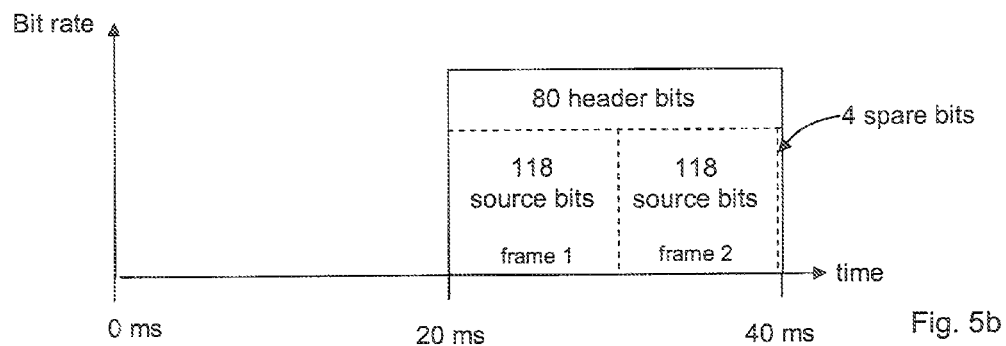
Figure 5C:
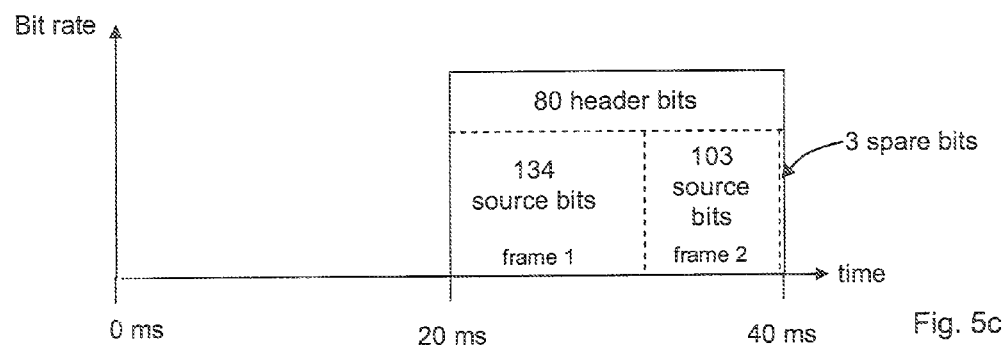

FIGS. 5a, 5b and 5c illustrate examples of how two frames may be aggregated into a packet using variable bit rate operation. FIG. 5a shows a regular (non-aggregated) source bit rate of, in this example, 12.2 kbps. This rate corresponds to AMR mode 12.2, which in turn corresponds to 244 source bits per frame. The overhead $p_1$ for each frame is 74 bits. The packet further includes two padding bits. Therefore, the total packet size for regular non-aggregated packets in this example is 320 bits. Now, in the situation where the SCR decision algorithm detects a sound (e.g. sustained unvoiced) that can be encoded with low bit rate, it may determine to aggregate two frames into one packet. The packetization overhead for the aggregated packet is 80 bits and so the number of bits available for source coding of the two frames within the aggregated packet is 240 bits. FIG. 5b shows a first example of frame aggregation in which the rate decision algorithm elects to assign the same number of source bits to each of the two frames, i.e. 120 bits. This makes it possible to apply AMR mode 5.9 for both of the frames, which utilizes 118 bits out of the 120 bits available for each frame. This leaves 4 bits unused in the packet.

FIG. 5c shows a second example of frame aggregation in which the rate decision algorithm elects to assign a slightly higher proportion of source bits available within the aggregated packet to the first frame compared to the second frame. One reason for doing this is that the required quality after coding of the first frame is determined to be greater than the required quality after coding of the second frame. In this case, 136 source bits are assigned to the first frame and 104 bits are assigned to the second frame. This means that coding of the first frame may use AMR mode 6.7, requiring 134 bits for the first frame, and that the second frame may use AMR mode 5.15, requiring 103 bits for the second frame. This means that a total of 237 source bits out of the available 240 bits are used in the packet, leaving 3 bits unused.

Note that in both the first and second examples the total packet size remains unchanged at 320 bits. Further, in these examples, only a few possible source bits would remain unused: 4 bits in the first example and 3 bits in the second example.

As discussed above, frame aggregation in general has the drawback of leading to extra aggregation delay, corresponding to the number of aggregated frames and their lengths. Referring back to the aggregation examples in FIG. 5, frame 1 is delayed until frame 2 is ready for packetization, which will take at least as much time as the duration of frame 2, which is 20 milliseconds. For many communication systems intended for carrying conversational speech (in real-time), transmission delays must be kept low. For this reason, frame aggregation is generally not used for carrying conversational speech as the additional end to end communication delay it causes is too great, giving a negative impact on communication quality. However, the methods and apparatus described herein overcome this problem such that the overhead reducing and bit rate saving benefits of frame aggregation are taken advantage of, yet, the end-to-end delay and thus communication quality is not generally impacted.

To illustrate this aspect of the methods and apparatus described herein, a brief overview of the chain of transmission delay in a VoIP telephony system will be given. The end-to-end delay is composed of various contributing factors, which include the algorithmic codec delay, signal processing delay for encoding and decoding, packetization delay, radio link transmission delay, core network transport delay, and jitter buffer delay.

Considering first the packetization delay and the jitter buffer delay, increased packetization delay could for instance be compensated for by reducing the jitter buffer delay, in order to keep the total end-to-end delay unchanged. The jitter delay compensates for variations in the amount of time it takes for frames to travel from one communication end to another end, if the jitter buffer delay is reduced then less time is allowed for a frame to travel and a higher proportion of frames are considered to have arrived too late. This increased late loss likelihood results in increased frame loss.

The frame loss concealment functionality of the decoder aims at concealing these frame losses. This works by extrapolating an estimation of the signal represented by the lost frame from the signal as represented by the previously received frames. Of course, typically such extrapolation is not perfect and there will be some difference between the extrapolated signal portion and the originally encoded signal portion which was represented in the lost frame. This difference impacts the reconstructed speech quality.

An advantage of the methods and apparatus disclosed herein is that frame aggregation is performed dependent upon the content of the frame, and/or the perceptual properties of the signal portion that the frame represents. This allows only the selection of a subset of frames to be aggregated. In particular, the frames that are selected for aggregation are those which, upon a loss due to too late packet arrival, can be extrapolated from the earlier received speech signal without significant perceptual impact. This may be determined at the encoding end by attempting to extrapolate a signal portion represented by a current frame from the preceding signal. If the difference between the extrapolated signal portion and the current, actual, signal portion is below a threshold value, then it may be determined that a decoder will be able to recreate an acceptable estimation of the signal portion if the frame representing the signal portion is not received or is received too late. As such, the encoder can risk increased likelihood of the frame not being received by aggregating it with a subsequent frame.

According to the apparatus and methods disclosed herein, a frame aggregation control unit takes into account properties of the input speech signal and the capability of the frame loss concealment unit of the decoder to conceal a potential frame loss. If, according to the analysis of this control unit, the current speech signal could be extrapolated properly from the past speech signal at a receiver or decoder, it may initiate the aggregation of a current speech frame into a packet with a subsequent frame. The frame aggregation control unit may, in its adaptation decision, consider various properties of the input signal; these could be signal parameters like energy, spectrum, voicing, etc. A particularly useful signal property that may be considered is stationarity. High stationarity means that the coding parameters remain relatively unchanged or at least predictable over time. High stationarity indicates that the decoder will likely be able to extrapolate a good approximation of the current signal portion from the preceding signal.

Considering next the delay budget on the LTE air interface, increased packetization delay due to frame aggregation can be compensated for in a system using transmission over an LTE air interface by reducing the delay budget on the LTE air interface. Reduction of the delay budget on the LTE air interface allows the over all end-to-end delay to be maintained at an acceptable level. However, this is generally not done since it reduces the likelihood of the HARQ re-transmission protocol successfully transmitting any lost speech data packets in case of a weak radio link. However, if frame aggregation is employed as described herein, then the only frames to be aggregated (and so delayed) would be those that are unlikely to significantly affect the received speech quality if they arrived too late at the receiver.

Figure 6:
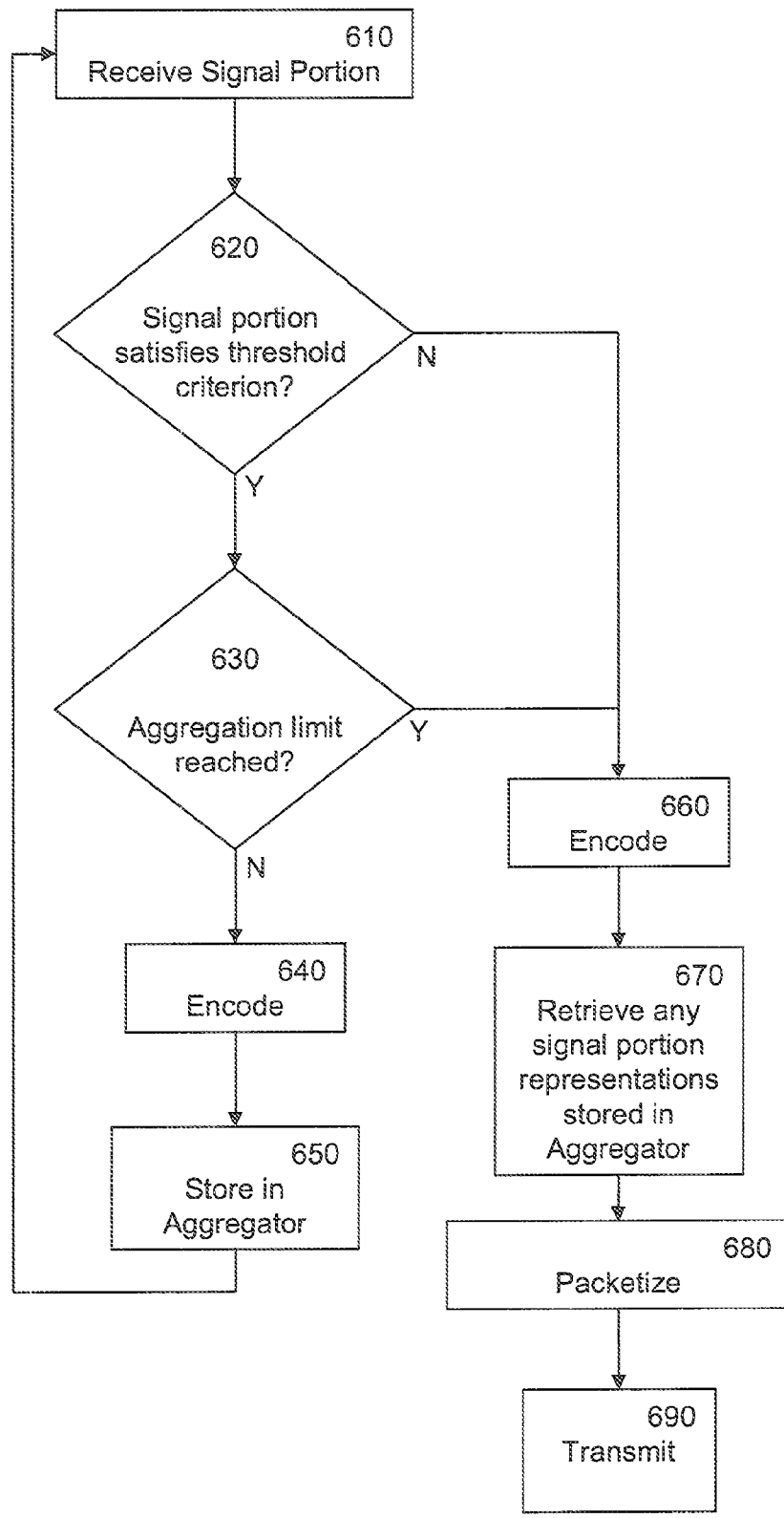
FIG. 6 illustrates a method as described herein.

FIG. 6 illustrates a method for processing a signal for transmission. At 610 a signal portion is received, the signal portion may comprise a frame of 20 milliseconds as used in many audio encoding algorithms. The signal portion is analyzed and a determination is made at 620 as to whether the signal portion satisfies a threshold criterion. In this example, the stationarity of the signal is measured to determine how well the frame loss concealment functionality of the receiver will be able to extrapolate the signal portion. If the stationarity is too low then it is determined a frame representing the signal should be transmitted and the signal portion is encoded at 660 to generate a representation of the signal portion If the stationarity of the signal portion is determined to be sufficiently high at step 620, then at step 630 a determination is made as to whether an aggregation limit has been reached. In this example, only two frames may be aggregated into one packet and so the aggregation limit will be determined to have been reached if the preceding frame was determined to be acceptable for aggregation. If at 630 the aggregation limit is determined not to have been reached, then the signal portion is encoded at 640 and stored in an aggregator memory at 650.

After a signal portion is encoded at 660, either due to the current signal portion not satisfying the threshold criterion, or the aggregation limit having been reached, then at 670 any encoded representations of previous signal portions are retrieved from the aggregator memory. At 680 the representation of the current signal portion and any representations of the signal portions retrieved from the aggregator memory are packetized into an aggregated packet. At 690 the aggregated packet is transmitted.

According to the embodiment illustrated in FIG. 6, the encoding at 640 and 660 is performed after determinations are made as to whether the packet or packets will be aggregated. This means that the encoding can be performed at the appropriate encoding rate for the number of source bits available within a packet, be it an aggregated packet or a non-aggregated packet.

Figure 7:
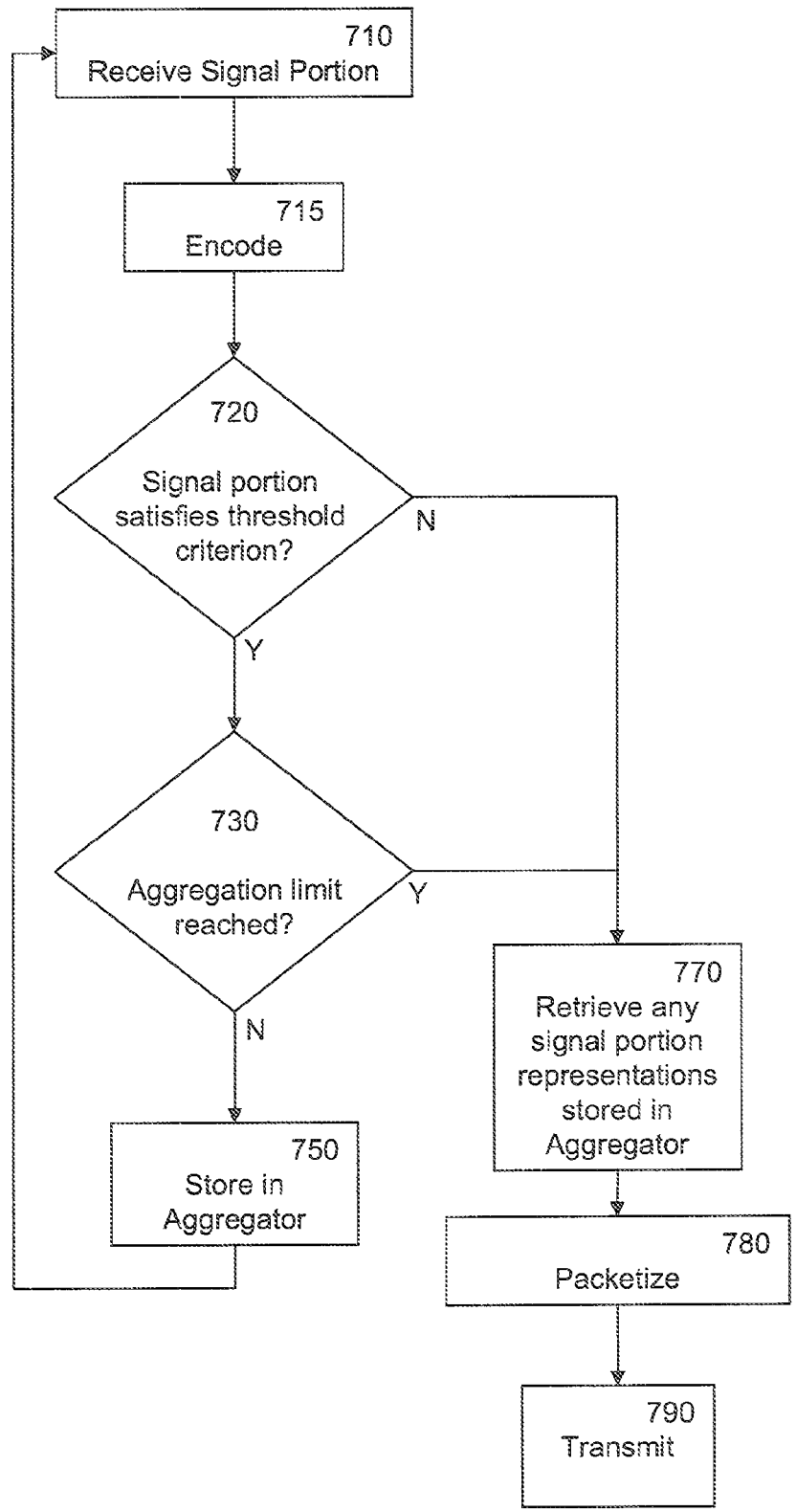
FIG. 7 illustrates an alternative method as described herein.

An alternative method for processing a signal for transmission is illustrated in FIG. 7. Like reference numerals are used to refer to like operations as compared to FIG. 6. A difference between the method of FIG. 7 compared to FIG. 6 is that encoding operations 640 and 660 are replaced by a single encoding operation at 715, immediately upon receipt of the signal portion at 710 and prior to the first determination at 720. Early encoding at 715 can be advantageous in reducing the calculation required for signal analysis to determine whether the signal portion satisfies the threshold criterion at 720. This can be particularly advantageous if, according to the first embodiment described above, frame aggregation is performed and aggregated packets are allowed to be larger than non-aggregated packets such that the same encoding rate can be used for a frame regardless of whether it will be aggregated or not.

However, where variable encoding rates are used to maintain a constant size of packet for aggregated and non-aggregated packets, then the encoding at 715 comprises encoding the received signal portion at a plurality of encoding rates to create a plurality of representations of the signal portion, each representation having a different size. Which representation to use will be determined prior to packetization at 780. This determination is made during aggregation at 770.

In one example the aggregation limit is two, and an aggregated packet has available source bits evenly divided between the two frames. Here, the encoding at 715 will only require two encoding rates to be used, such as AMR 12.2 and AMR 5.9 as illustrated in FIGS. 5*a* and 5*b*.

Figure 8:
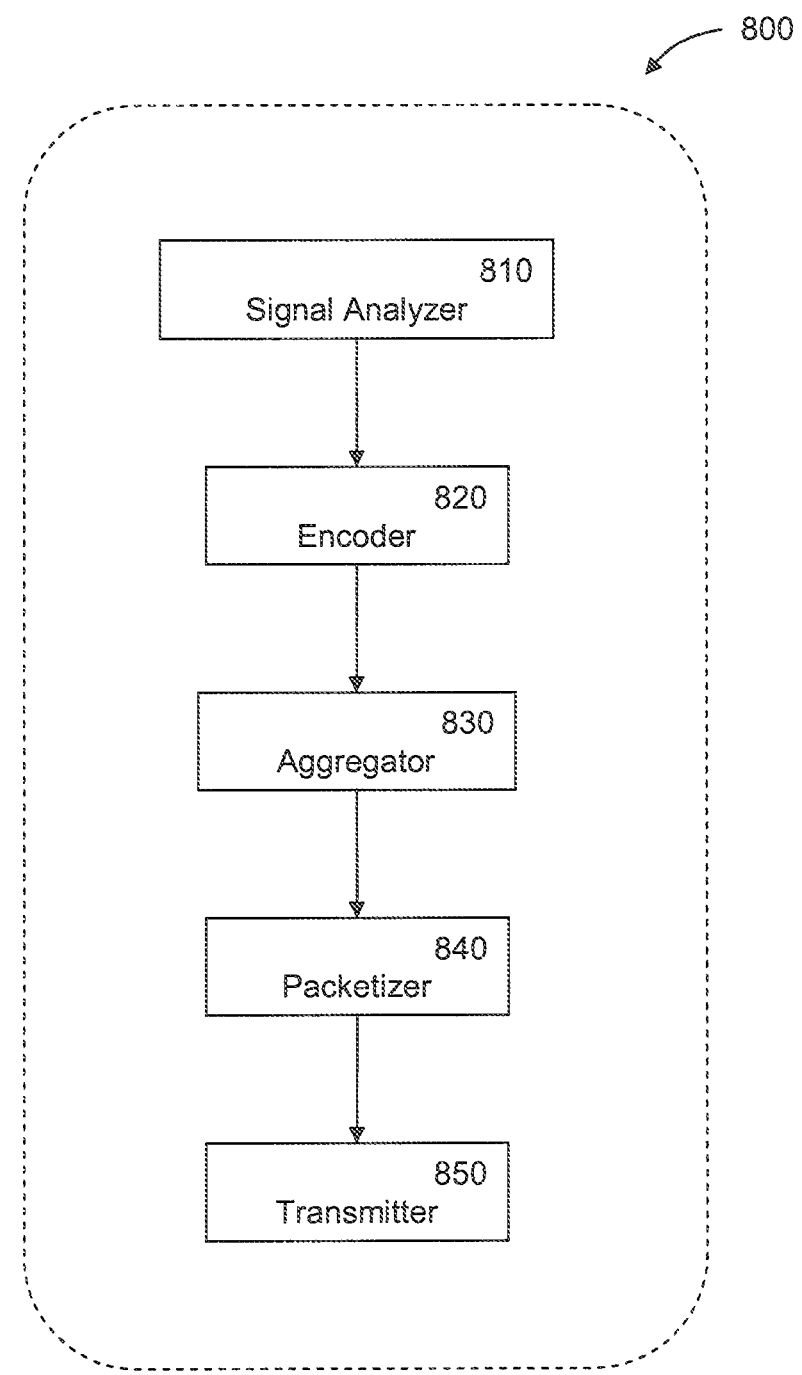
FIG. 8 illustrates an apparatus as described herein.

FIG. 8 illustrates an apparatus 800 suitable for implementing the methods described herein. The apparatus comprises a signal analyzer 810, an encoder 820, an aggregator 830, a packetizer 840 and a transmitter 850. The signal analyzer 810 receives a portion of the signal in the form of a frame and it analyzes at least one of the previously discussed properties of the input signal, such as stationarity, and determines whether the frame shall be transmitted as a single frame packet or whether it shall be aggregated with another frame. The signal analyzer 810 may also comprise a rate decision algorithm that selects the most suitable source coding rate for the frame (according to the method of the first embodiment such a determination is not necessary).

The encoder 820 performs the encoding of the received frame at a predetermined rate or rates, or at a rate as indicated by the source controlled rate and aggregation control unit.

Aggregator 830 performs aggregation based upon the determination made at the signal analyzer 810. The aggregator 830 contains a memory for storing encoded frames that will be aggregated with encoded representations of subsequently received frames. If the encoded frame is not to be aggregated it is directly propagated to the packetizer 840. Otherwise, the coded frame is stored in the aggregator memory. The aggregation is continued until either a frame that cannot be subjected to aggregation delay is received or until a limit of the number of frames that can be aggregated into a single packet is reached. When the aggregation is finished, the aggregated frame data is fed to the packetizer 840. The packetizer 840 packetizes the data received from the aggregator 830. The packetizer 840 is controlled by rate and frame aggregation parameters obtained from the signal analyzer 810. The frame aggregation parameter is typically the number of frames to be aggregated in the packet. After packetization, the packet is sent to transmitter 850 for transmission.

It is emphasized that neither the first embodiment (in which frames are aggregated but the encoding rate is not changed) nor the second embodiment (in which frames are aggregated and a variable bit rate for encoding is used) need be limited to the hangover period. These methods may be applied to any frames where a particular signal property, such as stationarity, is used to determine that an aggregation delay for that frame is acceptable. It may be assumed that because a frame is in the hangover period, it is not active voice (a pre-requisite for it to be in the hangover period) and thus subjecting the frame to an aggregation delay is acceptable. Similarly, the signal property that determines whether the frame should be aggregated may be whether the VAD classifies the frame as being within a hangover period.

It will be apparent to the skilled person that the exact order and content of the actions carried out in the method described herein may be altered according to the requirements of a particular set of execution parameters. Accordingly, the order in which actions are described and/or claimed is not to be construed as a strict limitation on order in which actions are to be performed.

Further, while examples have been given in the context of particular communications standards, these examples are not intended to be the limit of the communications standards to which the disclosed method and apparatus may be applied. For example, while specific examples have been given in the context of 3GPP standards, the principles disclosed herein can also be applied to any other telecommunication system.

The invention claimed is:

1. A method of processing a signal for transmission, the method comprising:
   determining a quality of a first portion of the signal; and
   if the quality satisfies a threshold criterion, then aggregating a representation of the first portion of the signal with a representation of a subsequent portion of the signal,
   wherein when the representation of the first portion satisfies the threshold criterion, a transmission of the representation of the first portion being delayed until when the representations of the first and the subsequent portions are transmitted together in an aggregated packet.

2. The method of claim 1, wherein the step of determining the quality of the first portion of the signal comprises making a comparison between the first portion of the signal and an estimation of the first portion of the signal.

3. The method of claim 2, wherein the estimation of the first portion of the signal is an estimation based upon at least one previous portion of the signal.

4. The method of claim 1, wherein the representation of a particular portion of the signal comprises encode parameters of the particular portion of the signal, the method further comprising:
encoding the first portion of the signal; and
encoding the subsequent portion of the signal.

5. The method of claim 4, wherein an encoding rate of a portion of the signal is determined according to at least one of:
a determined quality;
a number of representations of portions of the signal that are aggregated together; and
an encoding rate of another portion of the signal.

6. The method of claim 1, wherein a plurality of representations of portions of the signal are aggregated in the aggregated packet, and the aggregation stops when a most recently aggregated representation of a portion of the signal either:
satisfies a threshold maximum number of portions of the signal which may be aggregated and packetized into a single aggregated packet; or
has a quality that does not satisfy the threshold criterion.

7. The method of claim 1, the method further comprising:
packetizing the aggregated representations of portions of the signal in the aggregated packet.

8. The method of claim 1, further comprising transmitting the aggregated packet.

9. The method of claim 1, wherein the representation of the first portion of the signal is aggregated with the representation of the subsequent portion of the signal if the first portion is determined to be within a hangover period.

10. The method of claim 1, further comprising:
packetizing the representations of the first and subsequent portions of the signal in first and second packets, respectively, when it is determined that the first portion of the signal does not satisfy the threshold criterion, the first and second packets being different packets.

11. An apparatus configured to process a signal for transmission, the apparatus comprising:
a signal analyzer configured to determine a quality of a first portion of the signal; and
an aggregator configured to aggregate a representation of the first portion of the signal with a representation of a subsequent portion of the signal if the quality satisfies a threshold criterion,
wherein when the representation of the first portion satisfies the threshold criterion, a transmission of the representation of the first portion is delayed until when the representations of the first and the subsequent portions are transmitted together in an aggregated packet.

12. The apparatus of claim 11, further comprising:
an encoder configured to encode portions of the signal to generate respective representations of the portions of the signal.

13. The apparatus of claim 11, further comprising:
a packetizer configured to packetize the aggregated representations of portions of the signal in the aggregated packet.

14. The apparatus of claim 11, wherein the aggregator is configured to aggregate a plurality of representations of portions of the signal, and the aggregated representations of portions are packetized into the aggregated packet by a packetizer until when a most recent portion of the signal either:
satisfies a threshold maximum number of portions of the signal which may be aggregated into a single aggregated packet; or
has a quality that does not satisfy the threshold criterion.

15. The apparatus of claim 11, further comprising a transmitter configured to transmit the aggregated packet.

16. The apparatus of claim 11, wherein the representation of the first portion of the signal is aggregated with the representation of the subsequent portion of the signal if the first portion is determined to be within a hangover period.

17. The apparatus of claim 11, further comprising:
a packetizer configured to packetize the representations of the first and subsequent portions of the signal in first and second packets, respectively, when it is determined that the first portion of the signal does not satisfy the threshold criterion, the first and second packets being different packets.

18. A non-transitory, computer-readable medium configured to store instructions, which, when executed by computer logic, causes said computer logic to carry out the method defined by claim 1.

19. A method to process a signal for transmission, method comprising:
receiving the signal at a signal transmission apparatus, the signal comprising a plurality of signal frames including first and second signal frames, the second signal frame being immediately subsequent to the first signal frame;
determining, at the signal transmission apparatus, whether the first signal frame satisfies a threshold criterion; and
aggregating, at the signal transmission apparatus, a representation of the first signal frame of with a representation of the second signal frame into one aggregated packet when it is determined that the first signal frame satisfies the threshold criterion,
wherein a packetization overhead is reduced when the representations of the first and second signal frames are aggregated relative to when the representations of the first and second signal frames are packetized individually.

20. The method of claim 19, wherein a packet size of the aggregated packet equals a packet size of a frame of the signal whose representation is packetized individually.

21. The method of claim 19, wherein the step of aggregating the representations of the first and second signal frames into the aggregated packet comprises:
encoding the first signal frame to generate first encoded source bits as the representation of the first signal frame;
encoding the second signal frame to generate second encoded source bits as the representation of the second signal frame; and
packetizing the first and second encoded source bits into the aggregated packet.

22. The method of claim 21, wherein a number of the first encoded source bits is equal to a number of the second encoded source bits in the aggregated packet.

23. The method of claim 21, wherein a number of the first encoded source bits is different from a number of the second encoded source bits in the aggregated packet.

24. The method of claim 19, wherein the step of determining whether the first signal frame satisfies the threshold criterion comprises determining that the first signal frame satisfies the threshold criterion when it is determined that the first signal frame is a hangover frame.

25. The method of claim 19, wherein the step of determining whether the first signal frame satisfies the threshold criterion comprises determining that the first signal frame satisfies the threshold criterion when it is determined that the first signal frame is a hangover frame and that the first signal frame is not immediately subsequent to a last speech frame.

26. The method of claim 19, wherein the step of determining whether the first signal frame satisfies the threshold criterion comprises determining whether the first signal frame satisfies the threshold criterion based on one or both of properties of the signal and a frame loss concealment capability of a receiver.

27. The method of claim 19, wherein the step of determining whether the first signal frame satisfies the threshold criterion comprises:
- extrapolating from one or more signal frames previous to the first signal frame to generate an extrapolated signal frame;
- comparing the first signal frame to the extrapolated signal frame;
- determining that the first signal frame satisfies the threshold criterion when a difference between the first signal frame and the extrapolated signal frame is below a threshold value; and
- determining that the first signal frame does not satisfy the threshold criterion when the difference between the first signal frame and the extrapolated signal frame is not below the threshold value.

28. The method of claim 19, further comprising:
packetizing the representations of the first and second signal frames in first and second packets, respectively, when it is determined that the first signal frame does not satisfy the threshold criterion, the first and second packets being different packets.

* * * * *